UNITED STATES PATENT OFFICE.

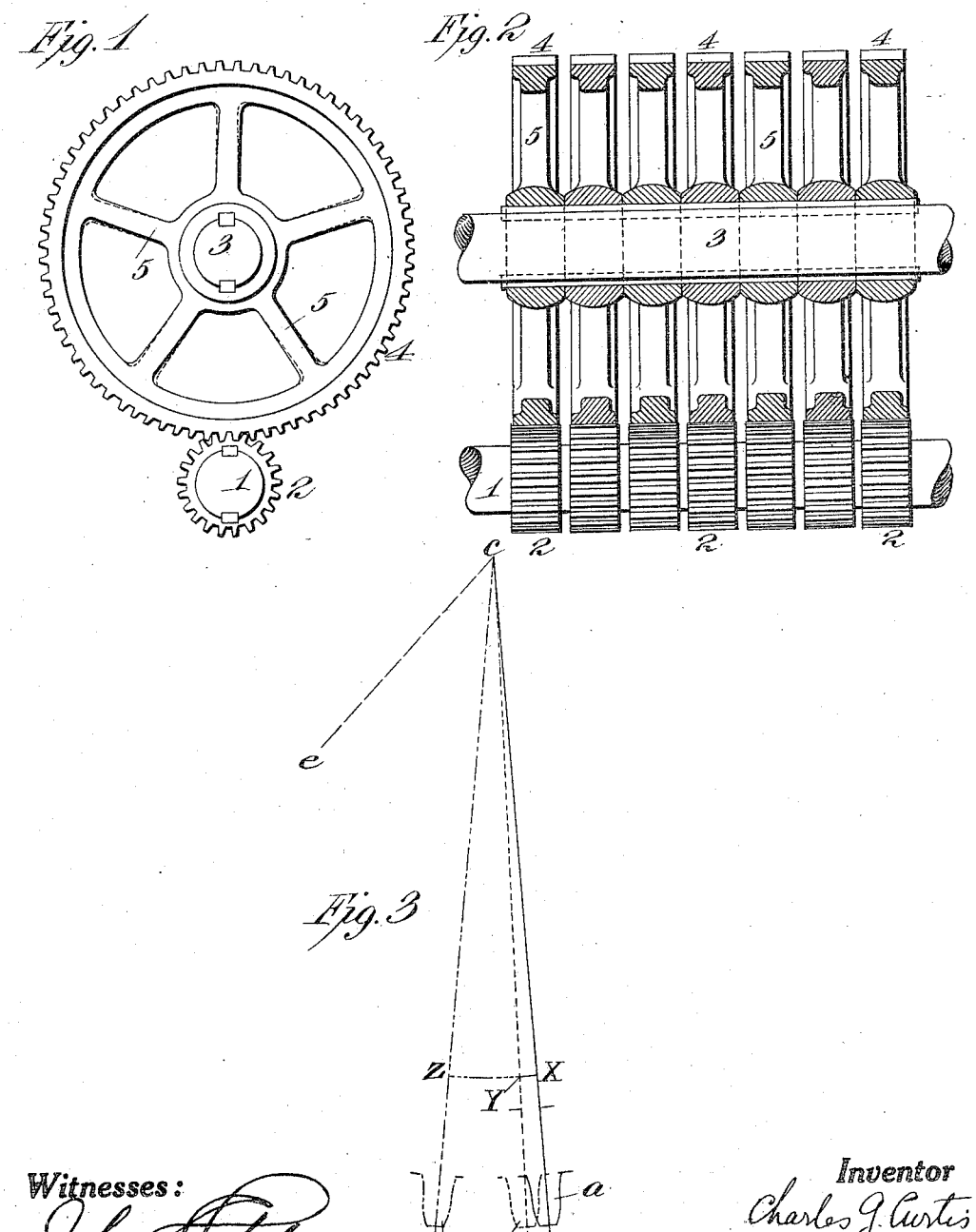

CHARLES G. CURTIS, OF NEW YORK, N. Y.

GEARING.

1,078,836.　　　　Specification of Letters Patent.　　Patented Nov. 18, 1913.

Application filed November 23, 1909. Serial No. 529,512.

*To all whom it may concern:*

Be it known that I, CHARLES G. CURTIS, a citizen of the United States, residing in the borough of Manhattan, city, county, and State of New York, have invented a certain new and useful Improvement in Gearing, of which the following is a specification.

The object of the present invention is to produce a mechanical gearing for transmitting heavy loads,—larger than can be transmitted by means of single gears. One use of the invention is in connection with marine propulsion, particularly with turbines or high speed engines in which the shaft speed for economy and simplicity should be higher than the propeller shaft speed and in which the load to be transmitted is greater than can be handled by ordinary gearing.

According to the present invention a plurality of gears is arranged in multiple upon two shafts and the load is equalized among the various gears so that each carries an equal or substantially equal proportion of the load, irrespective of inequalities in the adjustment of the gears or the alinement of the teeth. In my copending application for patent, filed November 23, 1909, Serial Number 529,513, I describe and illustrate several embodiments of the invention in which an equalizing device is used for distributing the load and for allowing stress and wear to come equally on the gears. In the present invention a different form of equalizing device is used embodying the broad invention set forth in said co-pending application.

In the drawings: Figure 1 is a side view of a structure embodying my invention; Fig. 2 is a vertical sectional view of the same, the pinions being shown in elevation; and Fig. 3 is a diagram.

In all of the views like parts are designated by the same reference characters.

In the embodiment illustrated the shaft 1—which is the shaft of higher speed—carries pinions 2, 2 etc.—seven being illustrated. The shaft 3, which is the shaft of lower speed, carries an equal number of gears 4, 4. Either shaft 1 or 3 may be the driving or driven shaft. As shown, the pinions 2, 2 and gears 4, 4 are keyed or otherwise secured to their shafts. In practice it would be difficult, if not impossible, to so aline the gears that each will properly engage with the teeth of its mate, and the load be properly distributed. If no provision were made for this it is apparent that the load would be carried by one or two gears, and therefore the limit of load which could be carried would be controlled by the breaking strain of these one or two gears.

According to my invention, I provide an equaling device which permits circumferential adjustment of the gears so that each carries its own equal or substantially equal proportion of the load. This equalizing device, in the embodiment chosen for illustration, comprises an elastic support for the gears 4, 4 on the shaft 3, such support providing for circumferential adjustment. As shown in Fig. 1, the rim of the gear is sufficiently thick to be stiff and not distortable under load. The spokes 5, 5 are reduced in cross section and so shaped that when under load they will bend to a position, roughly shown in solid lines in Fig. 1, thereby permitting circumferential adjustment of the rim of the gear 4. The spokes 5 should be so proportioned that they may be bent to cause all of the teeth on the several gears 4 to proportionately engage with the corresponding teeth on the pinions so as to carry their due proportion of the load, long before the elastic limit of the spokes is reached. By properly proportioning the spokes, each gear can be made to carry substantially its proper proportion of the load.

Reference being had to Fig. 3, the tooth $a$, shown in solid line, represents the tooth of one of the gears 4; the tooth $b$, shown in dotted lines, represents the corresponding tooth of another one of the gears 4. The teeth $a$ and $b$ are intended to represent the extreme positions of teeth due to the maximum error of alinement. This applies to where the two gears 4, 4 are used, or more.

$c$ represents the center of the gear 4, the angle $X Y c$ representing the circumferential extent of maximum error.

If $d$ represents the position of all teeth when under load, the angle $X c Z$ will represent the extent of maximum circumferential displacement of the gears, and the angle $Y c Z$, the angle of minimum displacement. If we asume that the angle $X Y c$ is one-tenth of the angle $X c Z$ and that ten gears are used, it is apparent that the distribution of load will be within ten per cent. To state the matter in another way,—the gear $b$, when moved to the position $d$, will carry nine-tenths of the load of the gear *a* when it is moved to the position *d*. It is apparent that, in order to permit this to be done, the position that the gear tooth can assume before the limit of elasticity of the stroke is reached must be very much greater,—as, for instance, the position *c e*.

From the foregoing description it will be seen that—although the teeth on the gears cannot be so adjusted that when at rest they will equally intermesh—it is apparent that, when the working load is upon the two shafts, the gears will circumferentially adjust themselves so that the load will be substantially equally distributed among the different gears. The idea may be carried out with any number of gears and it is apparent that the equalizing device may be applied to all or part of the gears, and that when applied wholly to the gears on one shaft, the gears on the other shaft, such as the pinions 2, need not be separate; and it is also apparent that bevel or spiral gears may be used. It is also apparent that any other form of an elastic or flexible equalizing device may be used,—the elastic spokes being chosen simply for the purpose of illustrating the preferred embodiment of the invention.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

1. In a gearing for transmitting heavy loads, the combination with two shafts, of several pairs of intermeshing tooth gears mounted on such shafts and transmitting motion from one shaft to the other, there being embodied in the construction unchecked elastic means permitting the relative circumferential self-adjustment of the several pairs of gears to distribute the load and having sufficient strength to carry the load, substantially as set forth.

2. In a gearing for transmitting heavy loads, the combination of a number of intermeshing tooth gears, the teeth of which are supported by elastic means yielding in the direction of the stress, substantially as set forth.

3. In a gearing for transmitting heavy loads, the combination of a number of intermeshing tooth gears, a sufficient number of such gears having yielding elastic spokes to distribute the load, substantially as set forth.

4. In a gearing for transmitting heavy loads and for reducing speed, the combination of a number of driving pinions and driven gear wheels, said driven gear wheels being provided with yielding elastic spokes to distribute the load, substantially as set forth.

This specification signed and witnessed this 22nd day of Nov., 1909.

CHARLES G. CURTIS.

Witnesses:
LEONARD H. DYER,
JOHN L. LOTSCH.

---

Copies of this patent may be obtained for five cents each, by addressing the "Commissioner of Patents, Washington, D. C."